(12) United States Patent
Shimamura et al.

(10) Patent No.: US 7,318,896 B2
(45) Date of Patent: Jan. 15, 2008

(54) METHOD AND APPARATUS FOR UTILIZATION OF RECOVERED MAGNESIUM AMMONIUM PHOSPHATE

(75) Inventors: Kazuaki Shimamura, Kamakura (JP); Toshihiro Tanaka, Fujisawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/564,448

(22) PCT Filed: Jul. 13, 2004

(86) PCT No.: PCT/JP2004/009961

§ 371 (c)(1),
(2), (4) Date: Jan. 12, 2006

(87) PCT Pub. No.: WO2005/005328

PCT Pub. Date: Jan. 20, 2005

(65) Prior Publication Data

US 2007/0017865 A1    Jan. 25, 2007

(30) Foreign Application Priority Data

Jul. 14, 2003   (JP)   ............................ 2003-274114

(51) Int. Cl.
*C02F 3/00*   (2006.01)

(52) U.S. Cl. ................. 210/610; 210/620; 210/624; 210/630; 210/906

(58) Field of Classification Search ................ 210/610, 210/906, 620–624, 630
See application file for complete search history.

(56) References Cited

FOREIGN PATENT DOCUMENTS

| EP | 0 970 922 | 1/2000 |
|---|---|---|
| JP | 8-155485 | 6/1996 |
| JP | 11-165184 | 6/1999 |
| JP | 2000-061274 | 2/2000 |
| JP | 2002-153846 | 5/2002 |

*Primary Examiner*—Chester T. Barry
(74) *Attorney, Agent, or Firm*—Oblon, Spivak, McClelland, Maier & Neustadt, P.C.

(57) ABSTRACT

A method utilizing inorganic nutrient salts, which are inexpensive and easily usable, for waste water whose aerobic and/or anaerobic biological treatment cannot be established unless inorganic nutrient salts are added, is provided. A method and apparatus are provided for utilizing recovered magnesium ammonium phosphate, characterized by adding the recovered magnesium ammonium phosphate, which has been recovered from a treatment process for organic waste and/or organic waste water treatment, to a biological treatment step comprising an anaerobic treatment step and/or an aerobic treatment step to utilize the recovered magnesium ammonium phosphate as an inorganic nutrient source. Preferably, the recovered magnesium ammonium phosphate is utilized as particles, with its particle size being 0.5 mm or less, and/or the pH of a liquid, to which magnesium ammonium phosphate is added, being 10 or lower.

8 Claims, 6 Drawing Sheets

METHOD AND APPARATUS FOR UTILIZATION OF RECOVERED MAGNESIUM AMMONIUM PHOSPHATE

TECHNICAL FIELD

This invention relates to a treatment method and apparatus utilizing inorganic nutrient salts, which are inexpensive and easily usable, for waste water whose aerobic and/or anaerobic biological treatment cannot be established unless inorganic nutrient salts are added.

BACKGROUND ART

Nitrogen and phosphorus contained in soil water are causative agents for eutrophication problems in rivers, oceans and water storage ponds, and their efficient removal by a sewage treatment process is desired.

Phosphorus resources are substances whose exhaustion in the 21st century is expected. Japan depends on imports for most of its phosphorus supply. Nowadays, there is a demand for a method for recovering phosphorus from organic wastes and waste water with high efficiency.

Various methods, such as a biological removal process, a coagulation-sedimentation process, a crystallization process, and an adsorption process, have so far been developed as methods for removing phosphorus from soil water containing phosphorus. These different treatment methods each have advantages and disadvantages. Of the methods, the crystallization process is advantageous in that it is basically free from the occurrence of sludge, recycling of the removed phosphorus is easy to perform, and phosphorus can be removed (recovered) in a stable state.

(Patent Document 1) describes a method for recovering phosphorus as magnesium ammonium phosphate (which may be hereinafter referred to as "MAP"), from waste water containing high concentrations of phosphorus and ammonia nitrogen. According to this MAP process, ammonium ions, phosphate ions, magnesium ions, and hydroxyl groups in liquids react in a manner as indicated by the formula (1) to form MAP. The resulting MAP can be recycled as a response-delayed fertilizer (magnesium ammonium phosphate-based).

[Chemical Formula 1]

$$Mg^{2+}+NH_4^{+}+HPO_4^{2-}+OH^{-}+6H_2O \rightarrow MgNH_4PO_4 \cdot 6H_2O \text{ (MAP)}+H_2O \quad (1)$$

When organic wastes such as sewage sludge, raw garbage, stock farm wastes, malt and used tea leaves, are anaerobically digested, they are finally decomposed into carbon dioxide and methane via a solubilization step for solid matter, an organic acid formation step, and a methane formation step. These organic wastes contain phosphorus and nitrogen, which are eluted into the liquids during the anaerobic digestion step. According to prior arts, MAP was formed from filtrates obtained by dehydration of these sludges, and the MAP was collected. The formation of MAP required phosphorus, ammonia nitrogen, magnesium, and an alkali in the liquids as described above and, if the filtrates lacked any of these substances, it was added.

Patent Document 1: Japanese Patent Application Laid-Open No. 2002-326089

DISCLOSURE OF THE INVENTION

Problems to be Solved by the Invention

Petrochemical waste water, paper pulp waste water, soft drink waste water, and alcohol beverage waste water are generally bioremediated anaerobically and/or aerobically. Anaerobic biological treatment is a method which maintains waste water in an anaerobic state in the presence of anaerobic bacteria, thereby allowing the anaerobic bacteria to grow to decompose organic matter in the waste water. During the decomposition step, the organic matter is finally decomposed into carbon dioxide and methane via a methane formation step by methane-forming bacteria. For microorganisms, phosphorus is a constituent of nucleic acids, phospholipids and coenzymes, and nitrogen serves as a constituent of proteins, nucleic acids and coenzymes. If inorganic salts in waste water, such as those of phosphorus and nitrogen, were insufficient, bacterial cell synthesis was difficult, sometimes resulting in a failure to obtain the desired quality of treated water. Similarly, in the case of aerobic treatment, the growth of aerobic bacteria was occasionally suppressed, leading to a decreased treating capacity.

The above waste waters are often lacking in phosphorus and nitrogen. Thus, phosphorus and nitrogen are added such that, with respect to BOD of raw water, BOD:N:P=100:2.5-5:0.5-1 for aerobic treatment, and BOD:N:P=100:0.25-0.5:0.05-0.1 for anaerobic treatment. However, the cost of the chemicals is enormous if the amount of waste water treated is large. Thus, inexpensive chemicals were eagerly demanded.

The present invention has been accomplished in the light of the above-described situation. To solve the above problems, it is an object of the invention to provide a method utilizing inorganic nutrient salts, which are inexpensive and easily usable, for waste water whose aerobic and/or anaerobic biological treatment cannot be established unless inorganic nutrient salts are added.

Means for Solving the Problems

The present invention has successfully solved the above-described problems by the following means:

(1) A method for utilizing recovered magnesium ammonium phosphate, characterized by adding the recovered magnesium ammonium phosphate, which has been recovered from a treatment process for organic waste and/or organic waste water treatment, to a biological treatment step comprising an anaerobic treatment step and/or an aerobic treatment step to utilize the recovered magnesium ammonium phosphate as an inorganic nutrient source.

(2) The method for utilizing recovered magnesium ammonium phosphate according to the above (1), characterized by utilizing the recovered magnesium ammonium phosphate as particles, with the particle size of the recovered magnesium ammonium phosphate being 0.5 mm or less, and/or with the pH of a liquid, to which magnesium ammonium phosphate is added, being 10 or lower.

(3) The method for utilizing recovered magnesium ammonium phosphate according to the above (1) or (2), characterized in that the biological treatment step is an anaerobic treatment step utilizing an acid fermentation tank, and the recovered magnesium ammonium phosphate is added to the acid fermentation tank.

(4) The method for utilizing recovered magnesium ammonium phosphate according to any one of the above (1) to (3), characterized in that the treatment step for organic waste and/or organic waste water treatment is a biological treatment step comprising an anaerobic treatment step and/or an aerobic treatment step, and the magnesium ammonium phosphate is recovered from treated water of the biological treatment step comprising the anaerobic treatment step and/or the aerobic treatment step.

(5) The method for utilizing recovered magnesium ammonium phosphate according to any one of the above (1) to (3), characterized in that the treatment step for organic waste and/or organic waste water treatment is a biological treatment step comprising an anaerobic treatment step and/or an aerobic treatment step, and the magnesium ammonium phosphate is utilized by being recovered from treated water of the biological treatment step comprising the anaerobic treatment step and/or the aerobic treatment step, and by being recirculated to the same anaerobic treatment step and/or the same aerobic treatment step of the biological treatment step.

(6) A treatment apparatus utilizing recovered magnesium ammonium phosphate, characterized in that the recovered magnesium ammonium phosphate, which has been recovered from a treatment process for organic waste and/or organic waste water treatment, is added, as an inorganic nutrient source, to a biological treatment apparatus having an anaerobic treatment tank and/or an aerobic treatment tank.

(7) The treatment apparatus according to the above (6), characterized in that the biological treatment apparatus is equipped with an acid fermentation tank, and the recovered magnesium ammonium phosphate is added to the acid fermentation tank.

(8) A biological treatment apparatus for an organic waste and/or organic waste water which utilizes recovered magnesium ammonium phosphate, comprising an anaerobic treatment tank and/or an aerobic treatment tank, a magnesium ammonium phosphate formation tank for accepting treated water discharged from the treatment tank to form magnesium ammonium phosphate, and piping for circulating the magnesium ammonium phosphate to the anaerobic treatment tank and/or the aerobic treatment tank.

(9) The biological treatment apparatus according to the above (8), characterized in that an acid fermentation tank is further provided upstream of the anaerobic treatment tank and/or the aerobic treatment tank, and the piping is disposed so as to introduce the magnesium ammonium phosphate from the magnesium ammonium phosphate formation tank into the acid fermentation tank.

(10) The biological treatment apparatus according to the above (8) or (9), characterized in that the magnesium ammonium phosphate formation tank is further provided with a means for adding a chemical containing magnesium, ammonium and/or phosphorus and/or a pH adjusting means.

The essence of the present invention lies in the discovery that if MAP, which has been recovered from a treatment process for an organic waste and/or organic waste water, is utilized as inorganic nutrient salts for waste water whose aerobic or anaerobic biological treatment cannot be established unless inorganic nutrient salts are added, huge costs can be markedly reduced. Particularly, it has been found that by setting the particle size of recovered MAP at 0.5 mm or less, and setting the pH of a liquid, to which MAP is added, at 10 or lower, MAP can be dissolved in a short time, proving even more effective.

Effect of the Invention

According to the present invention, there can be obtained a method utilizing inorganic nutrient salts, which are inexpensive and easily usable, by adding MAP, which has been recovered from a treatment process for organic waste and/or organic waste water treatment, to waste water whose aerobic or anaerobic biological treatment cannot be established unless inorganic nutrient salts are added. Further, MAP is formed into particles measuring 0.5 mm or less, and the pH of a liquid to which MAP is added is rendered at 10 or lower, whereby MAP can be dissolved in a short time. Thus, MAP can be easily utilized as inorganic nutrient salts.

In the present invention, in the case that recovered MAP is added to an acid fermentation tank located upstream of an anaerobic treatment tank, MAP can be dissolved more satisfactorily, and utilized as inorganic nutrient salts. This is a further advantage.

The present invention also concerns a biological treatment apparatus for an organic waste and/or organic waste water which utilizes recovered magnesium ammonium phosphate, comprising an anaerobic treatment tank and/or an aerobic treatment tank, a magnesium ammonium phosphate formation tank for accepting treated water discharged from the treatment tank to form MAP, and piping for circulating the MAP to the anaerobic treatment tank and/or aerobic treatment tank. According to this biological treatment apparatus, MAP is recovered and dissolved again for use as inorganic nutrient salts in the same biological treatment apparatus. Thus, excessive discharge of phosphorus can be prevented, and MAP can be utilized efficiently.

DESCRIPTION OF THE NUMERALS

| | |
|---|---|
| 1 | EGSB reactor |
| 2 | Acid fermentation tank |
| 3 | Aeration tank |
| 4 | Sedimentation basin |
| 5 | Raw water |
| 6 | MAP particles |
| 7 | Treated water |
| 8 | Circulating water |
| 9 | Return sludge |
| 10 | Magnesium ammonium phosphate formation tank |
| 11 | Piping |

BEST MODE FOR CARRYING OUT THE INVENTION

Embodiments of the present invention will now be described in detail with reference to the accompanying drawings. In all system diagrams illustrating the embodiments of the present invention, members having the same functions will be indicated by the same numerals.

Figure 1:
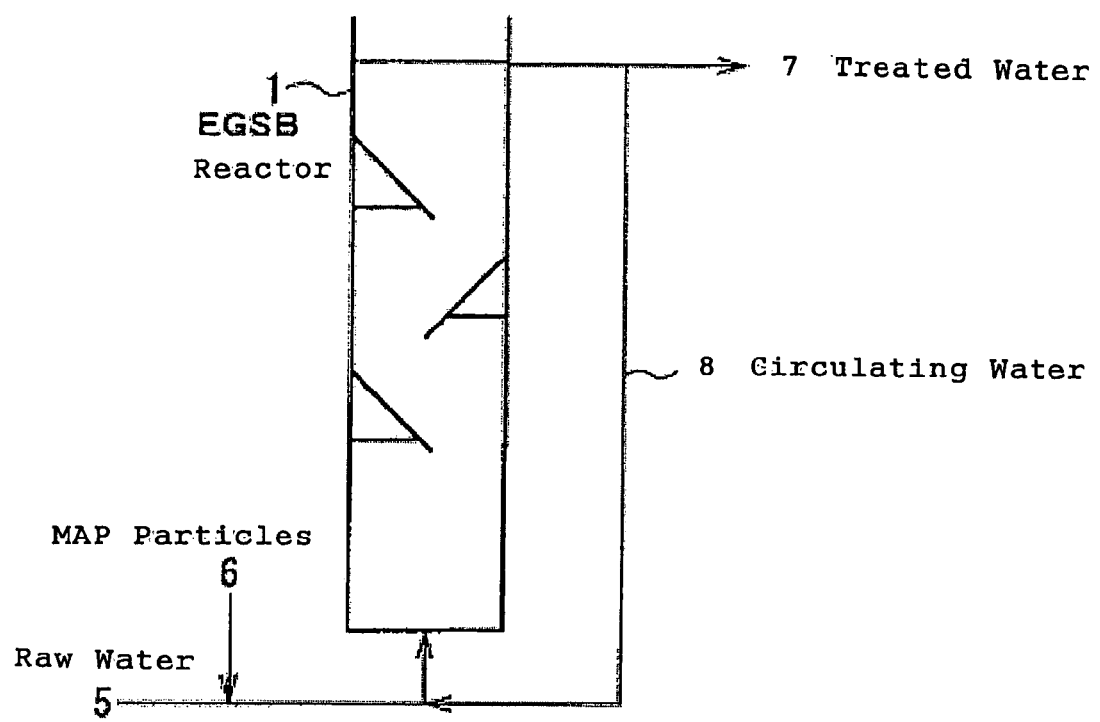
[FIG. 1] is a system diagram of an embodiment of the present invention which utilizes recovered MAP as an inorganic nutrient source for an anaerobic treatment step.

FIG. 1 is a system diagram illustrating a method of cleaning organic waste water, such as petrochemical waste water, paper pulp waste water, soft drink waste water, or alcohol beverage waste water, by anaerobic biological treatment. Anaerobic biological treatment utilizes an acid fermentation tank 2 and an EGSB reactor 1 (expanded granular sludge bed). However, anaerobic biological treatment does not necessarily require the acid fermentation tank 2 and, if organic matter in raw water 5 is already in a low molecular form, it may be directly charged into the EGSB process (EGSB reactor 1). Furthermore, a UASB (upflow anaerobic sludge blanket) tank, a fixed bed process, or a fluidized bed process may be used instead of the EGSB reactor 1. In FIG. 1, the numeral 5 denotes raw water, 6 denotes MAP particles, 7 denotes treated water, and 8 denotes circulating water.

In the present embodiment, MAP 6 recovered from a treatment step for an organic waste and/or organic waste water is added, as inorganic nutrient salts, to the above waste water 5.

The organic wastes include, for example, sewage sludge, raw garbage, stock farm wastes, malt and used tea leaves. When these solid materials are anaerobically digested, they are finally decomposed into carbon dioxide and methane via a solubilization step for the solid materials, an organic acid formation step, and a methane formation step, and phosphorus and nitrogen are eluted into the solution. By addition of magnesium and/or alkalis to this solution, MAP 6 is formed and recovered. The properties of the recovered MAP 6 differ according to the reactor, reaction conditions, etc., but the average particle size of MAP was 0.05 mm to 5 mm, and the purity of MAP was 10 to 90%.

It is to be noted that MAP is a sparingly soluble salt, and its solubility in water is low. The solubility of MAP (an anhydrous salt) is described as 0.0231 g/100 g at 0° C. and 0.0195 g/100 g at 80° C. (KYORITSU SHUPPAN K. K., "ENCYCLOPAEDIA CHIMICA", Vol. 9, page 817).

However, the amount of MAP dissolved is known to be pH-dependent. The inventors of this invention investigated the pH-dependence of the amount of MAP dissolved, and found that the lower the pH, the larger amount of MAP was dissolved, such that pH=5; 7000 mg/liter, pH=7; 1600 mg/liter, pH=9; 340 mg/liter, pH=10; 160 mg/liter, and pH=11; 74 mg/liter.

If the pH is lowered with the use of an acid, as described above, MAP can be dissolved relatively easily to obtain a solution containing phosphorus and ammonia in predetermined concentrations. However, this method was not necessarily an efficient method, because of the use of an acid chemical, the necessity for a separate MAP dissolution tank, and the necessity of adding a solution of low pH to a biological treatment tank.

Under these circumstances, it was attempted to charge MAP particles directly into the biological treatment tank, thereby directly dissolving MAP. However, even if the amount of MAP added was not larger than the solubility, MAP sometimes failed to dissolve, posing difficulty in obtaining the desired phosphorus concentration and ammonia concentration. A further disadvantage was that the undissolved MAP sometimes scaled and deposited on the bottom of the reactor.

Figure 2:
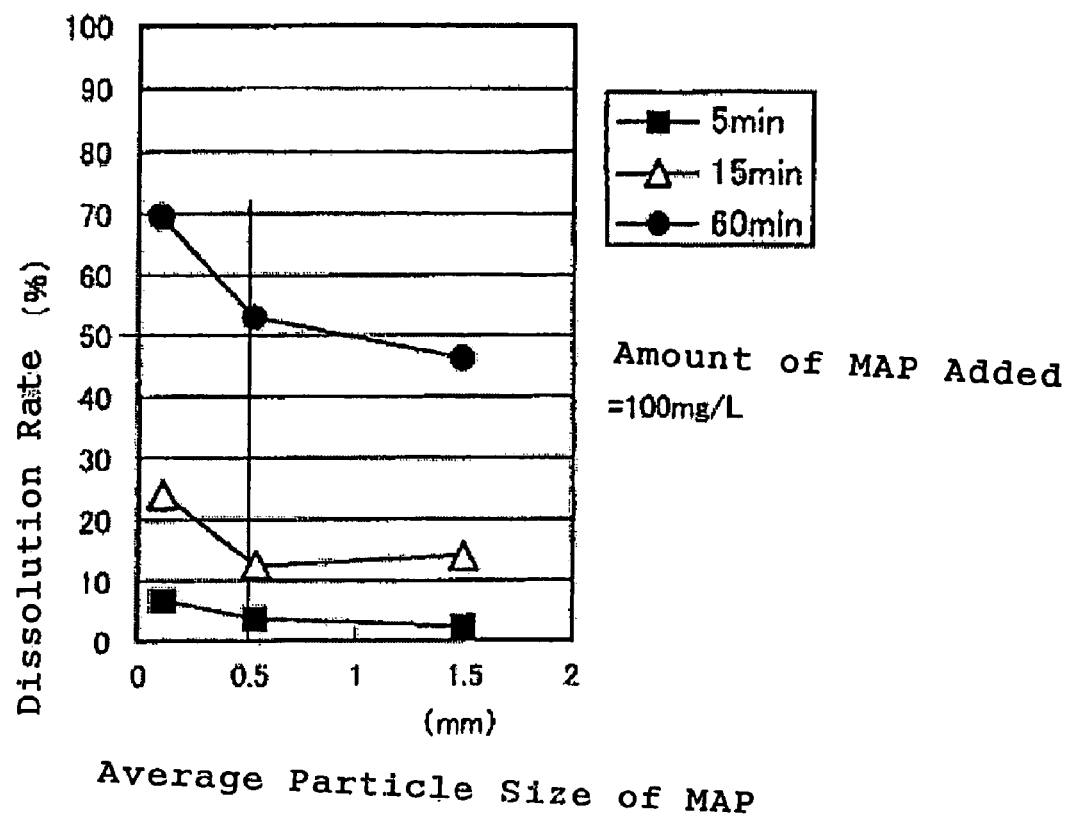
[FIG. 2] is a graph showing the relationship between the average particle size of MAP and a dissolution rate by dissolution time.

The inventors further studied an efficient method of dissolving recovered MAP as an inorganic nutritional supplement, and found that the dissolution rate of MAP differed according to the particle size of MAP. That is, as shown in FIG. 2, the dissolution rate was 69% for a particle size of 0.11 mm, 52% for a particle size of 0.52 mm, and 45% for a particle size of 1.5 mm, when the dissolution time was 1 hour. These findings showed that with the same dissolution time, the smaller the MAP particle size, the higher the dissolution rate, and a shorter time was required for dissolution.

This is assumed to be related to the specific surface area of MAP, and it is speculated that as the particle size decreases, the specific surface area increases, the solid-liquid contact surface area increases, and the diffusion rate of MAP increases. The reaction time of biological treatment, whether aerobic or anaerobic, is normally 1 hour or longer and, if 50% or more of MAP charged is dissolved within at least one hour, this is evaluated as an efficient dissolution. Thus, when recovered MAP is utilized as an inorganic nutrient source, the MAP should be in the form of particles with a particle size of 0.5 mm or less. Although it is preferred that all the particle sizes of MAP are preferably 0.5 mm or less, it is sufficient that the average particle size of MAP is 0.5 mm or less.

As mentioned above, the particle size of recovered MAP varies. If the MAP particle size is 0.5 mm or less, the MAP particles can be added unchanged. If the MAP particle size is 0.5 mm or more, the recovered MAP is sieved or classified. After grinding, an operation such as sieving or classification may be performed.

As stated earlier, the amount of MAP dissolved is pH-dependent, and the lower the pH, the larger amount is dissolved. For highly alkaline waste water, MAP does not dissolve even if its particle size is 0.5 mm or less. Even for highly alkaline waste water, the pH of the liquid in which MAP is dissolved should be 10 or lower, so that the amount of $NH_4$—N in the waste water is at least 10 mg/liter. If the pH of the waste water or the biological treatment tank is 10 or lower, there is no need for pH adjustment.

The site of addition of MAP 6 may be in raw water 5, a raw water adjustment tank, circulating water 8, or UASB tank (or EGSB reactor 1). If an acid fermentation tank 2 is provided as in FIG. 3, however, it is preferred to add MAP 6 to the acid fermentation tank 2, because pH in the acid fermentation tank 2 is 5 to 6, allowing MAP to dissolve easily.

Figure 4:
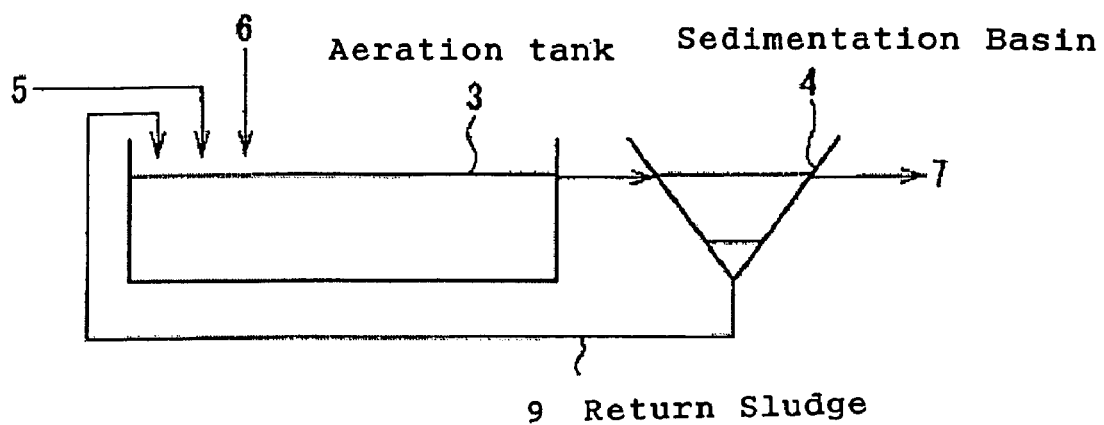
[FIG. 4] is a system diagram of an embodiment of the present invention which utilizes recovered MAP as an inorganic nutrient source for an aerobic treatment step.

FIG. 4 is a treatment flow for aerobically treating organic waste water. Recovered MAP 6 to be added should have all particle sizes or an average particle size of 0.5 mm or less, as in the case of anaerobic treatment. In the example of FIG. 4, the location of addition of recovered MAP 6 is an aeration tank 3, but the recovered MAP 6 may be supplied to raw water 5, or may be fed to a return line 9. Alternatively, recovered MAP 6 may be added to a raw water adjustment tank, if any.

Recovered MAP 6 may be utilized at the same treatment site as that where MAP 6 was recovered, or recovered MAP 6 may be transported to and utilized at a different waste water treatment site.

An embodiment in which recovered MAP after biological treated is returned to and utilized in the same biological treatment step will be described with reference to FIG. 5.

Figure 5:
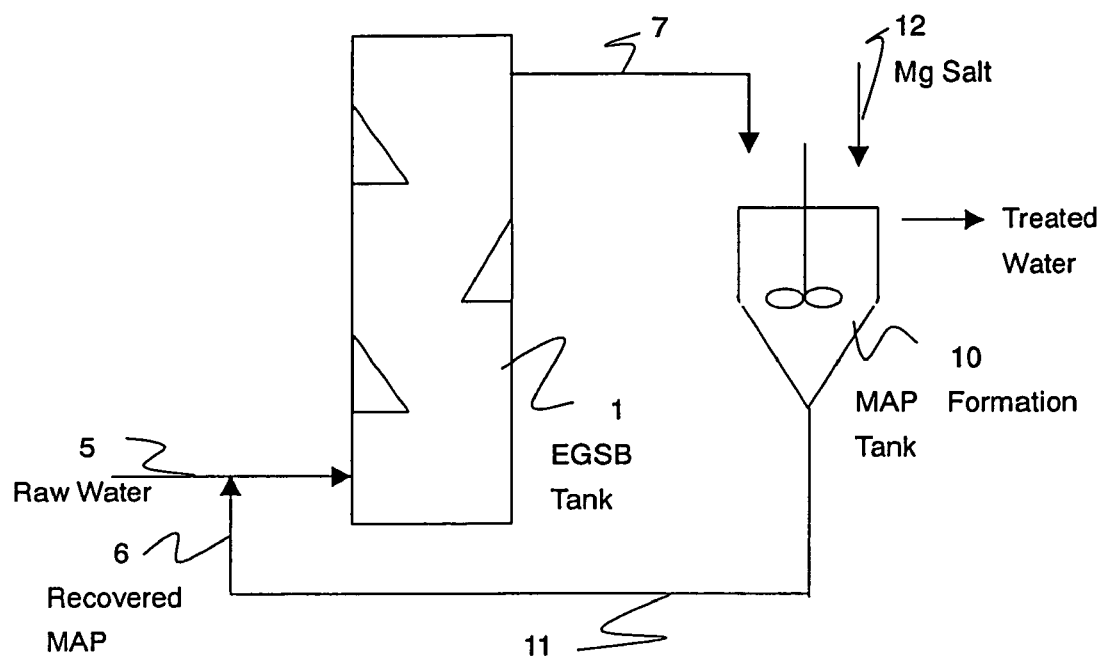
[FIG. 5] is a schematic explanation drawing showing another embodiment of an anaerobic treatment step according to the present invention, which utilizes recovered MAP as an inorganic nutrient source.

In the embodiment shown in FIG. 5, the biological treatment apparatus of the present invention comprises an EGSB tank 1, a magnesium ammonium phosphate formation tank 10 for accepting treated water discharged from the EGSB tank 1 to form MAP, and piping 11 for circulating MAP from the magnesium ammonium phosphate formation tank 10 to the EGSB tank 1. In the present embodiment, the piping 11 is connected to a raw water supply piping for supplying raw water 5 to the EGSB tank 1. The magnesium ammonium phosphate formation tank 10 is not limited, but is preferably configured to assist in the formation of MAP and to facilitate the introduction of the resulting MAP into the piping 11. Concretely, a liquid cyclone or a sedimentation tank, which has a stirrer and enables solid-liquid separation, can be preferably used as the magnesium ammonium phosphate formation tank 10. In the case of the liquid cyclone, the piping 11 may be connected to its bottom to withdraw the resulting MAP particles from the bottom of the liquid cyclone, whereby the circulation of MAP within the biological treatment apparatus can be performed easily. In the magnesium ammonium phosphate formation tank 10, preferably, a means 12 for adding magnesium, ammonium and/or phosphorus is provided, if desired, and a pH adjusting means (not shown) is further provided to control the crystal growth of MAP. It is preferred to adjust the average particle size of MAP formed in the magnesium ammonium phosphate formation tank 10, to 0.5 mm or less. Alternatively, the MAP formation time may be shortened to prevent MAP particles from growing to 0.5 mm or more, or MAP recovered by solid-liquid separation may be grind into particles measuring 0.5 mm or less.

In the present treatment apparatus, raw water to be treated is supplied, along with MAP as inorganic nutrient salts, to the EGSB tank 1 for anaerobic (EGSB) treatment. MAP contains an excess of phosphorus (phosphorus:nitrogen=2.2:1) over the ratio of phosphorus to nitrogen (of the order of 0.1:1) required for biological treatment. Normally, the operation management of the treatment apparatus involves the addition of inorganic nutrient salts in an amount of 1.1 to 10 times their theoretical requirement, in consideration of changes in the concentration of raw water. Thus, the excess inorganic nutrient salts may flow out together with treated water. Hence, the treated water after anaerobic treatment, which is discharged from the EGSB tank 1, contains phosphorus derived from the inorganic nutrient salts used in the anaerobic treatment, or may contain MAP. This treated water at least containing phosphorus is fed to the magnesium ammonium phosphate formation tank 10. In the magnesium ammonium phosphate formation tank 10, magnesium, ammonium and/or phosphorus are added to the treated water, and the pH is adjusted, if desired, to prepare MAP having a mean particle size of 0.5 mm or less. The prepared MAP or recovered MAP is added to the raw water 5 through the piping 11, and is utilized again for biological treatment of raw water.

Figure 6:
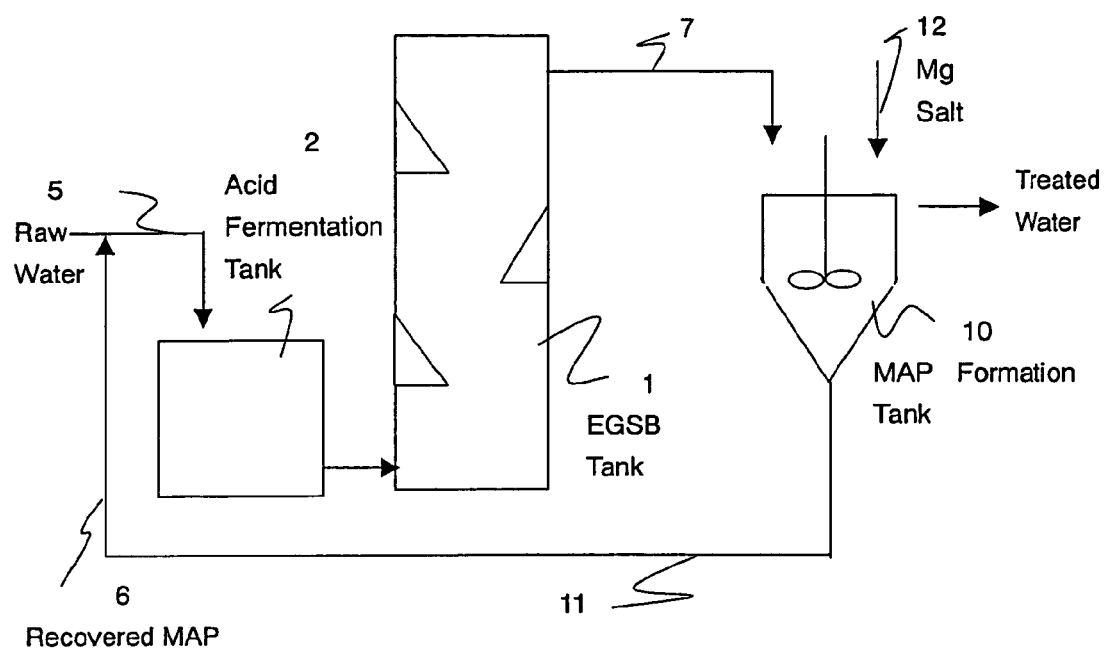
[FIG. 6] is a schematic explanation drawing showing an anaerobic treatment step according to the present invention, which utilizes recovered MAP, the anaerobic treatment step being used in Example 3.

As shown in FIG. 6, the biological treatment apparatus may include an acid fermentation tank 2. In this case, piping 11 can be disposed such that magnesium ammonium phosphate from the magnesium ammonium phosphate formation tank 10 is introduced into the acid fermentation tank 2. In FIG. 6, the piping 11 is connected to a raw water supply piping for supplying raw water 5 to the acid fermentation tank 2.

EXAMPLES

Hereinbelow, the present invention will be described more specifically by Examples, but is in no way limited by the Examples.

Example 1

In anaerobically treating the manufacturing process waste water of a paper pulp mill, 500 mg/liter of recovered MAP was added. MAP was recovered from a liquid separated from digested sludge. The particle size of the recovered MAP was 2.0 mm, but the MAP was grind to a particle size of 0.2 mm or less and utilized. The BOD of raw water was 4200 mg/liter, while the BOD of treated water was 420 mg/liter, showing that the BOD removal rate was 90%. The methane-forming activity of the sludge was measured, and found to be 0.8 kg-BOD/kg-sludge/d. In the treated water, the amount of $PO_4$—P was 30 mg/liter and the amount of $NH_4$—N was 10 mg/liter, so that inorganic nutrient salts were in ample supply. The pH in the anaerobic treatment step was 7.5.

Example 2

Figure 3:
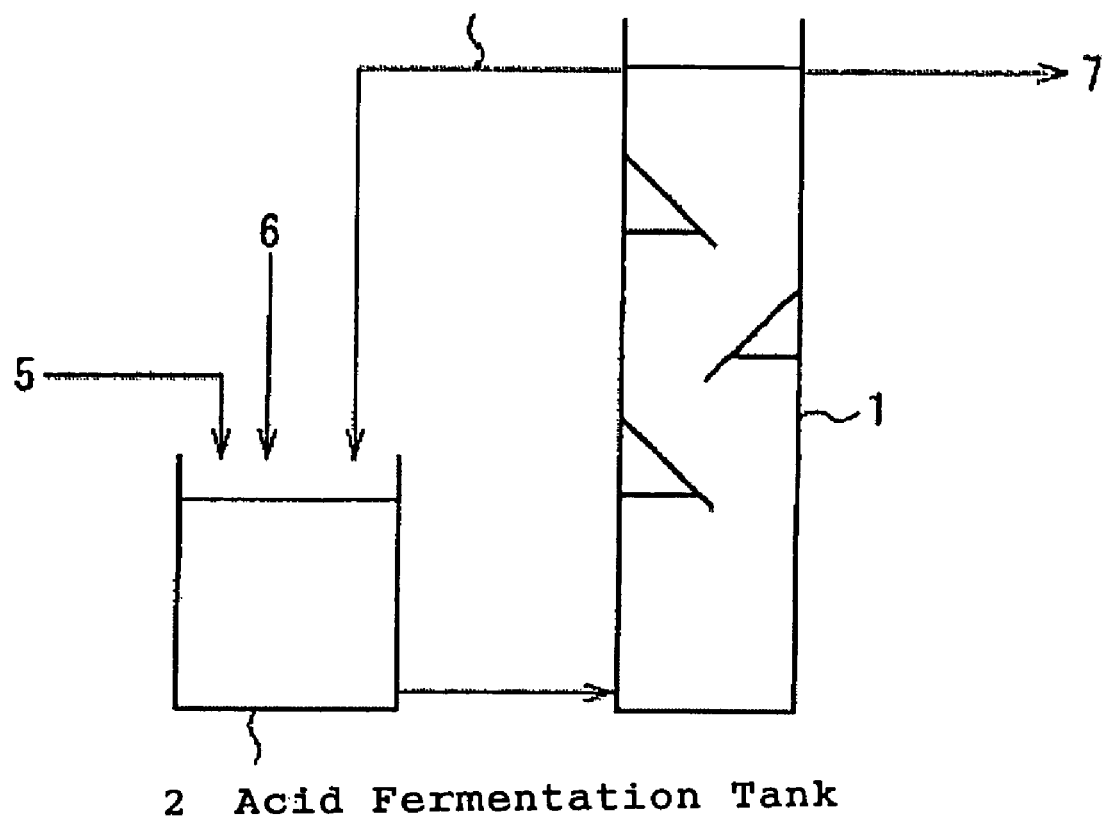
[FIG. 3] is a system diagram of another embodiment of the present invention which utilizes recovered MAP as an inorganic nutrient source for an anaerobic treatment step.

In Example 2, the utilization of recovered MAP in the treatment apparatus shown in FIG. 3 was evaluated. The procedure was the same as in Example 1, except that the position of addition of recovered MAP was in the acid fermentation tank 2. That is, MAP with an average particle size of 2.0 mm, which was recovered from the separated liquid from digested sludge, was grind into particles with an average particle size of 0.2 mm or less. The particles were added to the acid fermentation tank 2 in an amount of 500 mg/liter, and measurements were made of the BOD of treated water 7 from the EGSB tank 1 maintained at pH 7.5, the methane-forming activity of treatment sludge, and the $PO_4$—P and $NH_4$—N in the treated water. The analysis of the BOD was performed in accordance with a sewage treatment testing method. The methane-forming activity was measured by agitating a closed container containing a mixture of granule sludge, culture media, and waste water, and measuring the amount of a resultant methane gas. The $PO_4$—P was measured by molybdenum blue absorption spectrophotometry, and $NH_4$—N was measured by indophenol blue absorption spectrophotometry.

The BOD of raw water was 4200 mg/liter, while the BOD of treated water was 400 mg/liter, showing that the BOD removal rate was 90.5%. The methane-forming activity of the treatment sludge was found to be 0.8 kg-BOD/kg-sludge/day, similar to that of Example 1. In the treated water, the amount of $PO_4$—P was 50 mg/liter and the amount of $NH_4$—N was 20 mg/liter, showing that a larger amount of MAP than in Example 1 was dissolved.

Example 3

In Example 3, the recirculated utilization of MAP in the biological treatment apparatus shown in FIG. 6 was evaluated as the utilization of recovered MAP. The biological treatment apparatus shown in FIG. 6 comprises an EGSB tank 1, a magnesium ammonium phosphate formation tank 10 for accepting treated water discharged from the EGSB tank 1 to form MAP, and piping 11 for circulating MAP from the magnesium ammonium phosphate formation tank 10 to the EGSB tank 1. The piping 11 is connected to a raw water supply piping. Further, an acid fermentation tank 2 is provided upstream of the EGSB tank 1, and raw water 5 and MAP 6 are introduced into the acid fermentation tank 2 via the raw water supply piping.

In an initial operation, 500 mg/liter of MAP particles with an average particle size of 0.2 mm were added to the raw water 5, and biological treatment was carried out. Treated water 7 discharged from the EGSB tank 1 was accepted into the magnesium ammonium phosphate formation tank 10, where a magnesium salt and an ammonium salt, which would otherwise be insufficient for MAP formation, were added, and the pH of the system was adjusted to 8.0 to 9.5. By this adjustment, MAP was formed, and recovered as 100 mg/liter of MAP particles with an average particle size of 0.5 mm or less. The average particle size of the MAP particles was brought to 0.5 mm or less by adjusting the residence time of the MAP particles in the magnesium ammonium phosphate formation tank 10 to one day or shorter. The average particle size of the MAP particles was measured, at the appropriate times, by use of a particle size distribution measuring instrument using the laser diffraction method. The recovered MAP particles (100 mg/liter) were added again to the raw water 5 in the raw water supply piping through the piping 11. Fresh MAP particles (400 mg/liter) with an average particle size of 0.2 mm or less were further added to the raw water 5, and the MAP particles were recirculated into the biological treatment apparatus, with the total amount of the MAP particles added to the raw water 5 being 500 mg/liter.

Biological treatment was performed in the same manner as that of Example 2, and treated water after the biological treatment was measured.

The BOD of the raw water was 4200 mg/liter, while the BOD of the treated water was 400 mg/liter, showing that the BOD removal rate was 90.5%. The methane-forming activity of the treatment sludge was found to be 0.8 kg-BOD/kg-sludge/day, similar to that of Example 1. In the treated water, the amount of $PO_4$—P was 50 mg/liter and the amount of $NH_4$—N was 20 mg/liter, showing that the same results as those of Example 2 were obtained, and a larger amount of MAP than in Example 1 was dissolved.

Comparative Example 1

As in Example 1, in anaerobically treating the manufacturing process waste water of a paper pulp mill, recovered MAP was added in an amount of 500 mg/liter. MAP measuring 2 mm was added without being grind. The BOD of raw water was 4000 mg/liter, while the BOD of treated water was 2000 mg/liter, showing that the BOD removal rate was 50%. The methane-forming activity of the sludge was measured, and found to be 0.5 kg-BOD/kg-sludge/day, showing a lower activity than in Example 1. In the treated water, the amount of $PO_4$—P was 0.1 mg/liter or less, and the amount of $NH_4$—N was 0.1 mg/liter or less, so that inorganic nutrient salts were in short supply. Since the inorganic nutrient salts were thus insufficient, the activity of the sludge was judged to have declined. The pH in the anaerobic treatment step was 7.5.

MAP, which remained insufficiently dissolved, deposited at the bottom in the interior of the reactor. It is assumed that the dissolution time was not sufficient because of the large particle size.

The invention claimed is:

1. A method for utilizing recovered magnesium ammonium phosphate particles in a biological treatment process comprising an anaerobic treatment and/or an aerobic treatment, the method comprising the steps:

recovering the magnesium ammonium phosphate particles from a treatment process for organic waste and/or waste water treatment, and adding the recovered magnesium ammonium phosphate particles to an acid fermentation tank as an inorganic nutrient source in the biological treatment process.

2. The method of claim 1, wherein the recovered magnesium ammonium phosphate particles have an average particle size of 0.5 mm or less.

3. The method of claim 1 further comprising the step of dissolving the recovered magnesium ammonium phosphate particles in a treated liquid produced during the biological treatment, wherein pH of the treated liquid is adjusted to 10 or lower.

4. The method of claim 1, wherein the treatment process for organic waste and/or waste water treatment is the biological treatment process comprising the anaerobic treatment and/or the aerobic treatment, and wherein the magnesium ammonium phosphate particles are recovered from a treated liquid produced during the biological treatment process.

5. The method of claim 1, wherein the magnesium ammonium phosphate particles are recovered from a treated liquid produced during the biological treatment process, and wherein the recovered magnesium ammonium phosphate particles are recycled to the acid fermentation tank in the same biological treatment.

6. A treatment apparatus utilizing recovered magnesium ammonium phosphate particles, the apparatus comprising an acid fermentation tank, wherein the magnesium ammonium phosphate particles are recovered from a treatment process for organic waste and/or waste water treatment, and the recovered magnesium ammonium phosphate particles are added to the acid fermentation tank as an inorganic source.

7. A biological treatment apparatus for organic waste and/or waste water treatment comprising:

an acid fermentation tank;

an anaerobic treatment tank and/or an aerobic treatment tank provided downstream of the acid fermentation tank;

a magnesium ammonium phosphate formation tank for accepting a treated liquid in the anaerobic treatment tank and/or the aerobic treatment tank; and a piping for circulating magnesium ammonium phosphate particles from the magnesium ammonium phosphate formation tank to the acid fermentation tank.

8. The biological treatment apparatus of claim 7, wherein the acid fermentation tank is further provided with a means for adding a chemical containing magnesium, ammonium and/or phosphorous and/or a pH adjusting means.

* * * * *